US006340528B1

(12) United States Patent
Hsieh et al.

(10) Patent No.: US 6,340,528 B1
(45) Date of Patent: Jan. 22, 2002

(54) CROSSLINKABLE POLYMER COMPOSITIONS FOR DONOR ROLL COATINGS

(75) Inventors: Bing R. Hsieh, Webster, NY (US); Yuan Yu, North Billerica, MA (US); Timothy J. Fuller, Pittsford, NY (US); John F. Yanus, Webster, NY (US); Damodar M. Pai, Fairport, NY (US); Heiko Rommelmann, Webster, NY (US); Allen J. Thompson, Sodus, NY (US); Donald S. Stanton, Penfield, NY (US); Michelle L. Schlafer, Fairport, NY (US); Alan R. Kuntz; Ann M. Kazakos, both of Webster, NY (US); William H. Wayman; Steven C. Hart, both of Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,288

(22) Filed: Jan. 19, 2000

(51) Int. Cl.[7] ................................................ B23B 27/36

(52) U.S. Cl. ....................... 428/412; 428/325; 428/327; 428/332; 428/923.1; 428/447; 428/973.5; 428/479.4; 428/480; 428/500; 428/906; 428/908.8; 399/3; 399/63; 492/18; 492/53

(58) Field of Search ......................... 492/18, 53; 399/3, 399/66; 428/412, 423.1, 447, 473.5, 474.4, 480, 500, 906, 908.8, 323, 325, 327, 332

(56) References Cited

U.S. PATENT DOCUMENTS

| | | | | |
|---|---|---|---|---|
| 4,338,222 A | | 7/1982 | Limburg et al. | 252/500 |
| 4,868,600 A | | 9/1989 | Hays et al. | |
| 5,172,170 A | | 12/1992 | Hays et al. | 399/266 |
| 5,264,312 A | | 11/1993 | Stolka et al. | 430/130 |
| 5,300,339 A | | 4/1994 | Hays et al. | 428/36.9 |
| 5,583,906 A | | 12/1996 | Sugiura et al. | |
| 5,587,224 A | | 12/1996 | Hsieh et al. | 428/195 |
| 5,731,078 A | | 3/1998 | Hsieh et al. | 428/335 |
| 5,976,744 A | | 11/1999 | Fuller et al. | 430/58.8 |
| 6,004,709 A | * | 12/1999 | Renfer et al. | 430/58.65 |

* cited by examiner

*Primary Examiner*—Blaine Copenheaver
*Assistant Examiner*—Christopher Paulraj
(74) *Attorney, Agent, or Firm*—Oliff & Berridge, PLC

(57) ABSTRACT

A donor member, useful in ionographic or electrophotographic apparatuses and preferably useful in hybrid scavengeless development units, has a substrate and an oxidized transport coating thereover. The oxidized transport coating includes a polymer binder, charge transporting molecules and one or more oxidizing agents. The polymer binder of the donor roll coating preferably includes one of (1) a crosslinked polymer with charge transporting molecules dispersed therein, or (2) a crosslinked polyamide binder with hydroxy charge transport molecules dispersed therein. The donor roll is preferably included in a printing machine that develops latent images formed on a photoconductive member.

10 Claims, 3 Drawing Sheets

CROSSLINKABLE POLYMER COMPOSITIONS FOR DONOR ROLL COATINGS

CROSS REFERENCE TO RELATED APPLICATIONS

Attention is directed to application U.S. patent application Ser. No. 09/128,160, filed Aug. 3, 1998, entitled, "Oxidized Transport Donor Roll Coatings" now U.S. Pat. No. 6,289,196, and U.S. patent application Ser. No. 08/950,303, filed Oct. 14, 1997, entitled "Conductive Polymer Composition and Processes Thereof," now U.S. Pat. No. 5,853,906 . The disclosures of these applications are hereby incorporated by reference in their entireties.

BACKGROUND OF THE INVENTION

The present invention relates to coatings for ionographic or electrophotographic, including digital and image on image, imaging and printing apparatuses and machines, and more particularly is directed to coatings for donor members and particularly donor members including electrodes closely spaced therein to form a toner powder cloud in the development zone to develop a latent image. The present invention is directed, in embodiments, to suitable conductive and semiconductive overcoatings, especially for donor member or transport members like scavengeless, or hybrid scavengeless development systems.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive surface. After the electrostatic latent image is recorded on the photoconductive surface, the latent image is developed. Two component and single component developer materials are commonly used for development. Toner particles are attracted to the latent image forming a toner powder image on the photoconductive surface, the toner image is subsequently transferred to a copy sheet, and finally, the toner powder image is heated to permanently fuse it to the copy sheet in image configuration.

One type of development system is a single component development system such as a scavengeless development system that uses a donor roll for transporting charged toner (single component developer) to the development zone. At least one, and preferably a plurality of electrode members, are closely spaced to the donor member in the development zone. An AC voltage is applied to the electrode members forming a toner cloud in the development zone. The electrostatic fields generated by the latent image attract toner from the toner cloud to develop the latent image.

Another type of development system is a two component development system such as a hybrid scavengeless development system which employs a magnetic brush developer member for transporting carrier having toner (two component developer) adhering triboelectrically thereto. A donor member is used in this configuration also to transport charged toner to the development zone. The donor member and magnetic member are electrically biased relative to one another. Toner is attracted to the donor member from the magnetic member. The electrically biased electrode members detach the toner from the donor member forming a toner powder cloud in the development zone, and the latent image attracts the toner particles thereto. In this way, the latent image recorded on the photoconductive member is developed with toner particles.

Coatings for donor members are known and may contain a dispersion of conductive particles in a dielectric binder. The desired volume resistivity is achieved by controlling the loading of the conductive material. However, very small changes in the loading of conductive materials at or near the percolation threshold can cause dramatic changes in resistivity. Furthermore, changes in the particle size and shape of such materials can cause wide variations in the resistivity at constant weight loading. A desired volume resistivity of the coating is from about $10^7$ to about $10^{13}$ ohms-cm, and preferably from about $10^8$ to about $10^{11}$ ohms-cm. If the resistivity is too low, electrical breakdown of the coating can occur when a voltage is applied to an electrode or material in contact with the coating. Also, resistive heating can cause the formation of holes in the coating. When the resistive heating is too high, charge accumulation on the surface of the overcoating can create a voltage which changes the electrostatic forces acting on the toner. The problem of the sensitivity of the resistivity to the loading of conductive materials in an insulative dielectric binder is avoided, or minimized with the coatings of the present invention.

Currently, ceramic materials are used for donor members such as donor members used in hybrid scavengeless development apparatuses. Several problems are associated with use of ceramic materials including non-uniform thickness, non-uniform run-out, pinhole defects, and rough surface finish. These problems can result in print defects. The problems are not easily overcome because they may be related to the deformation of substrate during high temperature thermal spray coating of ceramic materials. Grinding the ceramic coatings is needed to provide the desired surface finish. This additional, difficult, and low yield manufacturing process results in high unit manufacturing costs. In addition, the electrical conductivity of ceramic coating cannot be easily controlled and reproduced.

However, with the coatings of the present invention, the above problems with use of ceramic materials are reduced or eliminated.

Other coatings for donor members are described in the literature including the following patents.

U.S. Pat. No. 5,300,339 discloses a coated toner transport roll containing a core with a coating thereover.

U.S. Pat. No. 5,172,170 discloses an apparatus in which a donor roll advances toner to an electrostatic latent image recorded on a photoconductive member. The donor roll includes a dielectric layer disposed about the circumferential surface of the roll between adjacent grooves.

U.S. Pat. No. 5,386,277 discloses a coated toner donor member wherein the coating comprises oxidized polyether carbonate.

U.S. Pat. No. 5,448,342 discloses a coated transport means comprising a core and a coating comprising charge transporting molecules and oxidizing agent or agents dispersed in a binder.

U.S. Pat. No. 4,338,222 discloses an electrically conducting composition comprising an organic hole transporting compound and the reaction product of an oxidizing agent capable of accepting one electron from the hole transporting compound.

U.S. Pat. No. 5,587,224 discloses a coated donor roll comprising a core with a coating comprising a photolysis reaction product of a charge transporting polymer and a photoacid compound.

U.S. Pat. No. 5,264,312 discloses a process for preparing a photoreceptor by forming a coating following curing. The coating comprises an electroactive material dispersed in a polymerizable film forming monomer, which is first polymerized into a solid matrix.

U.S. Pat. No. 5,731,078 discloses a coated donor roll comprising a substrate with a coating comprising a charge transport molecule, metal salts of an organic acid and a polymer binder.

U.S. patent application Ser. No.09/182,602, filed Oct. 29, 1998, now U.S. Pat. No. 6,103,436 and incorporated herein by reference in its entirety, describes an electrophotographic imaging member including a supporting substrate coated with at least photoconductive layer, a charge transport layer and an overcoating layer, the overcoating layer including a hydroxy functionalized aromatic diamine and a hydroxy functionalized triarylamine dissolved or molecularly dispersed in a crosslinked polyamide matrix, the crosslinked polyamide prior to crosslinking being selected from the group consisting of materials represented by the following Formulae I and II:

I

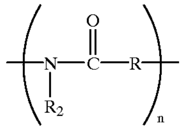

wherein:

n is a positive integer sufficient to achieve a weight average molecular weight between about 5000 and about 100,000, R is an alkylene unit containing from 1 to 10 carbon atoms, between 1 and 99 percent of the $R_2$ sites are —H, and the remainder of the $R_2$ sites are $—CH_2—O—CH_3$, and

II

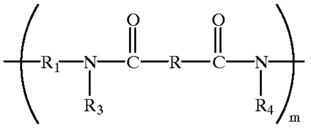

wherein:

m is a positive integer sufficient to achieve a weight average molecular weight between about 5000 and about 100000, $R_1$ and R are independently selected from the group consisting of alkylene units containing from 1 to 10 carbon atoms, and between 1 and 99 percent of the $R_3$ and $R_4$ sites are —H, and the remainder of the $R_3$ and $R_4$ sites are $—CH_2—O—CH_3$.

U.S. Pat. No. 5,976,744, incorporated herein by reference in its entirety, describes an n electrophotographic imaging member including a supporting substrate coated with at least one photoconductive layer, and an overcoating layer, the overcoating layer including a hydroxy functionalized aromatic diamine and a hydroxy functionalized triarylamine dissolved or molecularly dispersed in a crosslinked acrylated polyamide matrix, the hydroxy functionalized triarylamine being a compound different from the polyhydroxy functionalized aromatic diamine, the crosslinked polyamide prior to crosslinking being selected from the group consisting of two specific types of materials.

There exists a need for a donor member coating which provides conductivity or resistivity within a desired range, minimizes residue voltage, is relatively uniform and virtually free from defects and pinholes, provides good wear resistance for up to several million, for example 10 million copies, provides consistent performance with variable temperature and humidity, is low in cost, is easy to apply and is environmentally acceptable.

SUMMARY OF THE INVENTION

These and other objects are achieved by the present invention. In a first aspect of the invention, the invention pertains to a donor member comprising a substrate and having thereover a crosslinked oxidized transport coating comprising a charge transport molecule, a crosslinkable polymer binder, and an oxidant. The polymer binder of the donor roll coating may include one or more of (1) a crosslinked polymer with charge transporting molecules and oxidants or oxidized salts dispersed therein, or (2) crosslinked polyamides with hydroxy charge transport molecules and optional oxidants dispersed therein. In both cases, optional additives such as particulates can be added to the crosslinked binders.

In a further aspect of the invention, the invention pertains to a printing machine wherein an electrostatic latent image recorded on a photoconductive member is developed to form a visible image thereof, comprising a housing defining a chamber storing a supply of developer material; a donor member spaced from the photoconductive member and being adapted to transport toner to a region opposed from the photoconductive member, the donor member comprising a substrate and having thereover a crosslinked oxidized transport coating comprising a charge transport molecule, a crosslinkable polymer binder, and an oxidant; and electrode members in the donor member, the electrodes being electrically biased to detach toner from the donor member so as to form a toner cloud in the space between the electrode member and the photoconductive member, with detached toner from the toner cloud developing the electrostatic latent image formed on the photoconductive member.

DETAILED DESCRIPTION OF PREFERRED EMBODIMENTS

The present invention relates to coatings for donor members in development units for electrostatographic, including digital and image on image, imaging and printing apparatuses, and especially for hybrid scavengeless development units.

Figure 1:
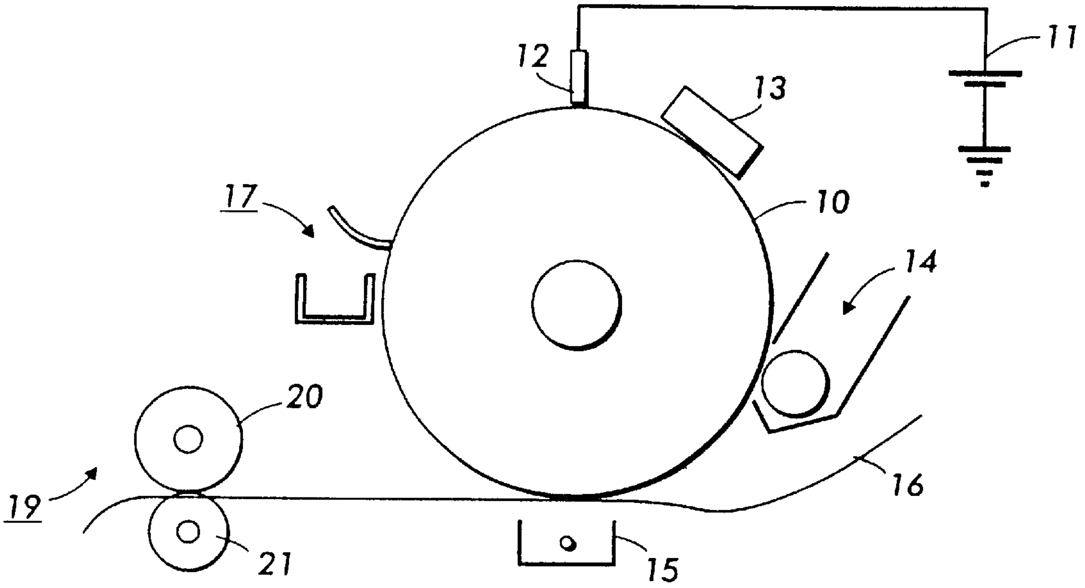
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as faser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
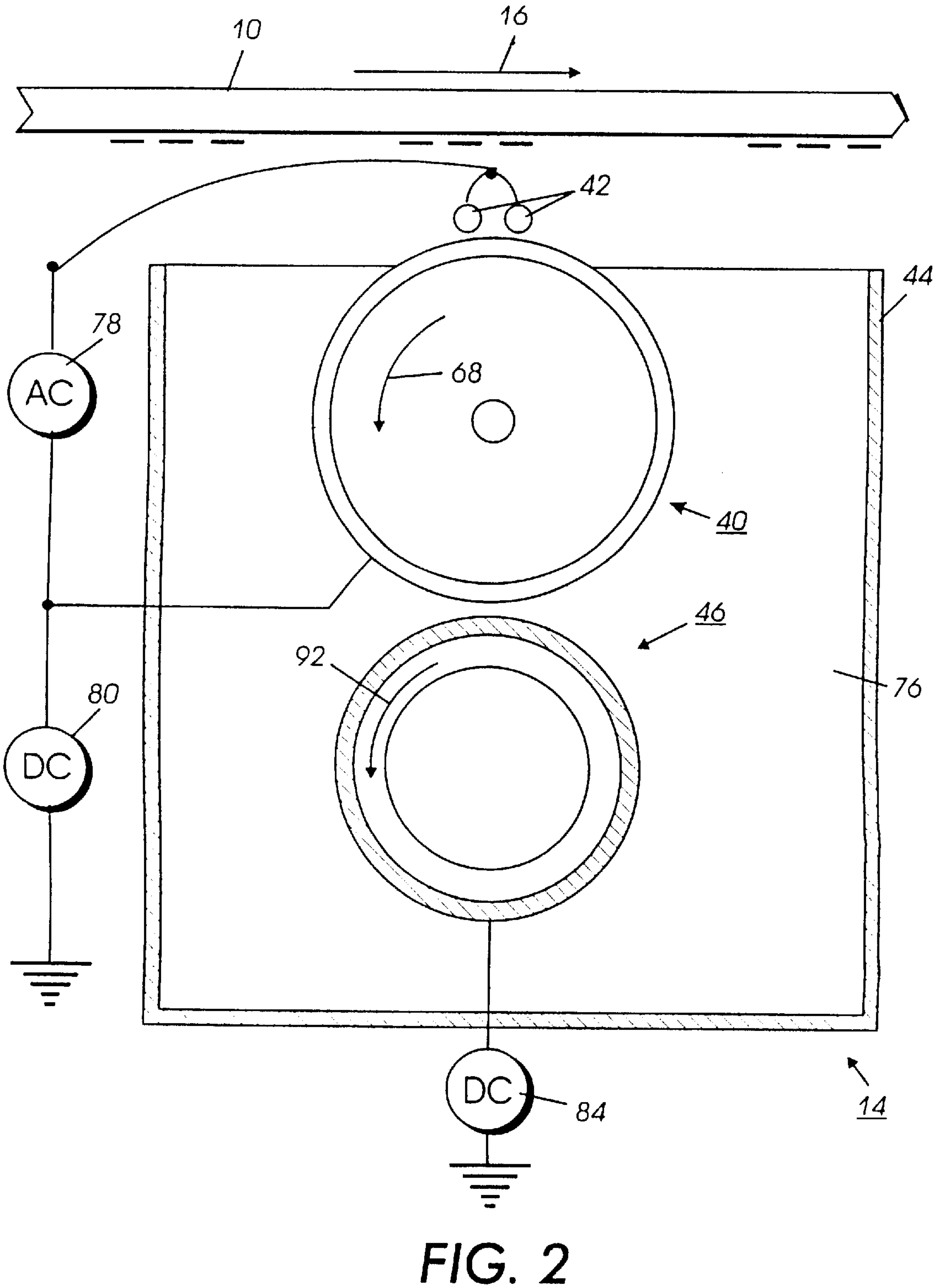
FIG. 2 is a schematic illustration of an embodiment of a development apparatus useful in an electrophotographic printing machine.

Referring now to FIG. 2, in a preferred embodiment of the invention, developer unit 14 develops the latent image recorded on the photoconductive surface 10. Preferably, developer unit 14 includes donor roller 40 and electrode member or members 42. Electrode members 42 are electrically biased relative to donor roll 40 to detach toner therefrom so as to form a toner powder cloud in the gap between the donor roll 40 and photoconductive surface 10. The latent image attracts toner particles from the toner powder cloud forming a toner powder image thereon. Donor roller 40 is mounted, at least partially, in the chamber of developer housing 44. The chamber 76 in developer housing 44 stores a supply of developer material which is a two component developer material of at least carrier granules having toner particles adhering triboelectrically thereto. A magnetic roller 46 disposed interior of the chamber of housing 44 conveys the developer material to the donor roller 40. The magnetic roller 46 is electrically biased relative to the donor roller so that the toner particles are attracted from the magnetic roller to the donor roller.

The donor roller can be rotated in either the ‘with’ or ‘against’ direction relative to the direction of motion of photoreceptor 10. In FIG. 2, donor roller 40 is shown rotating in the direction of arrow 68. Similarly, the magnetic roller can be rotated in either the ‘with’ or ‘against’ direction relative to the direction of motion of belt 10. In FIG. 2, magnetic roller 46 is shown rotating in the direction of arrow 92. Photoreceptor 10 moves in the direction of arrow 16.

A pair of electrode members 42 are shown extending in a direction substantially parallel to the longitudinal axis of the donor roller 40. The electrode members are made from one or more thin (i.e., 50 to 100 $\mu$m in diameter) stainless steel or tungsten electrode members which are closely spaced from donor roller 40. The distance between the electrode members and the donor roller is from about 5 to about 35 $\mu$m, preferably about 10 to about 25 $\mu$m or the thickness of the toner layer on the donor roll. The electrode members are self-spaced from the donor roller by the thickness of the toner on the donor roller.

As illustrated in FIG. 2, an alternating electrical bias is applied to the electrode members by an AC voltage source 78. The applied AC establishes an alternating electrostatic field between the electrode members and the donor roller is effective in detaching toner from the photoconductive member of the donor roller and forming a toner cloud about the electrode members, the height of the cloud being such as not to be substantially in contact with the photoreceptor 10. The magnitude of the AC voltage is relatively low and is in the order of 200 to 500 volts peak at a frequency ranging from about 9 kHz to about 15 kHz. A DC bias supply 80 which applies approximately 300 volts to donor roller 40 establishes an electrostatic field between photoconductive member 10 and donor roller 40 for attracting the detached toner particles from the cloud surrounding the electrode members to the latent image recorded on the photoconductive member. At a spacing ranging from about 10 $\mu$m to about 40 $\mu$m between the electrode members and donor roller, an applied voltage of 200 to 500 volts produces a relatively large electrostatic field without risk of air breakdown. A DC bias supply 84 which applies approximately 100 volts to magnetic roller 46 establishes an electrostatic field between magnetic roller 46 and donor roller 40 so that an electrostatic field is established between the donor roller and the magnetic roller which causes toner particles to be attracted from.

In an alternative embodiment of the present invention, one component developer material consisting of toner without carrier may be used. In this configuration, the magnetic roller 46 is not present in the developer housing. This embodiment is described in more detail in U.S. Pat. No. 4,868,600, the disclosure of which is hereby incorporated by reference in its entirety.

Figure 3:
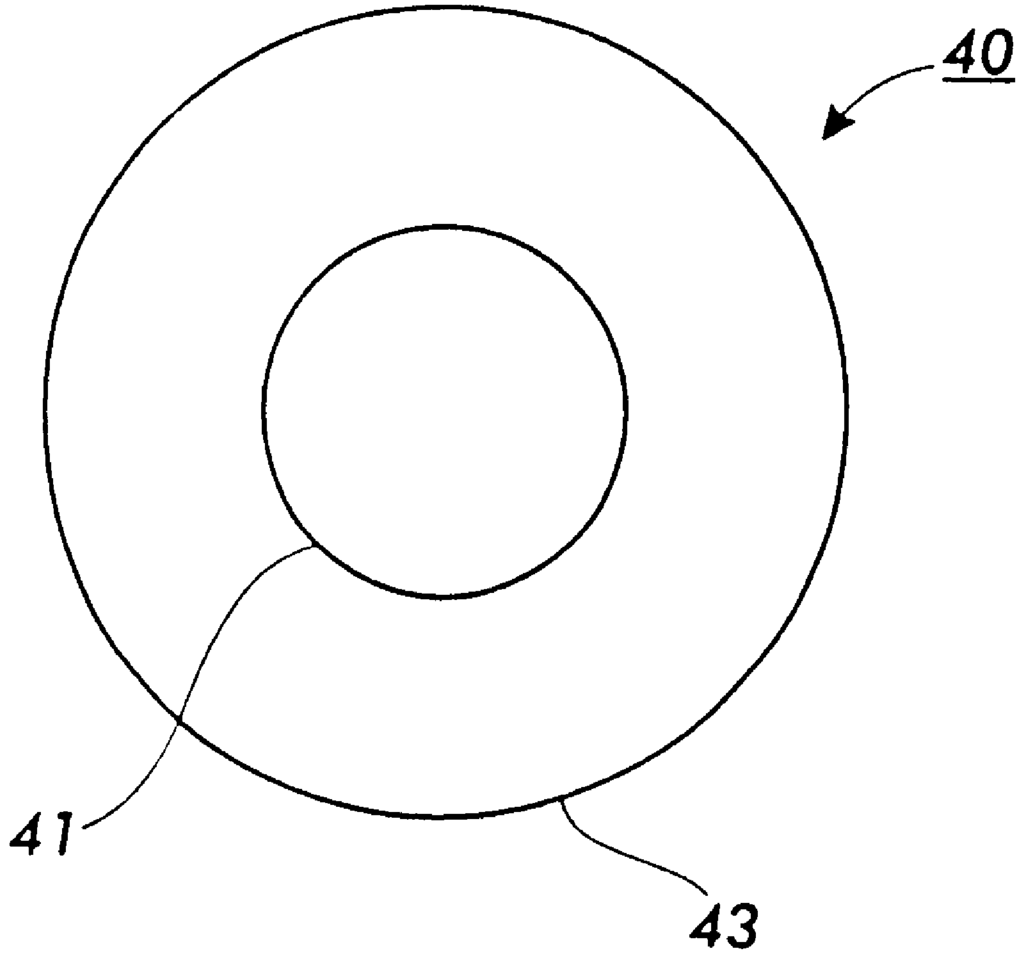
FIG. 3 is a fragmentary schematic illustration of a development housing comprising a donor roll and an electrode member.

The donor member of the present invention may be in the form of a donor roller as depicted in FIGS. 2 and 3. As shown in FIG. 3, the donor member 40 includes a substrate 41 which may comprise metal substrates such as, for example, copper, aluminum, nickel, and the like metals, plastics such as, for example, polyesters, polyimides, polyamides, and the like, glass and like substrates, which may be optionally coated with thin metal films, and a coating 43 including a semi-conductive relaxation layer which is an oxidized transport layer.

The oxidized transport layer comprises polymer binder, charge transporting molecules and one or more oxidizing agents.

The polymer binder of the donor roll coating preferably comprises one of (1) a crosslinked polymer with charge transporting molecules and oxidants or oxidized salts dispersed therein, or (2) crosslinked polyamide with hydroxy charge transport molecules and optional oxidants dispersed therein. In both cases, optional particulate or fibril fillers can be added to the crosslinked binders.

As the polymer for the crosslinked polymer with charge transporting molecules dispersed therein, crosslinkable polymer binders having the following general structure are most preferred:

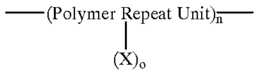

The polymer repeat unit is preferably selected from among polyethers, polycarbonates, polyethercarbonates, polyesters, polyimides, polyimines, polyurethanes, polysiloxanes, polyethersulfones, polystyrenes. n is a positive integer sufficient to achieve a weight average molecular weight between about 5,000 and about 200,000. $(X)_o$, representative of the crosslinkers, is preferably selected from $(CH_2)_mCH{=}CH_2$, $(CH_2)_mOCH_2CH_2OCH{=}CH_2$, $(CH_2)_m$—OH(Na, K, Li), —$(CH_2)_m$—$NH_2$,

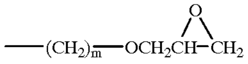

—$(CH_2)_mOCN$, —$CH_2OC(O)CH{=}CH_2$, $CH_2(CH_2)_m$ $CH_2COCl$ and norborene, wherein m is an integer of from, for example, 1 to 12, more preferably 1 to 2, while o=0.2 to 2.0

Preferred crosslinkable polymers prior to crosslinking include the following:

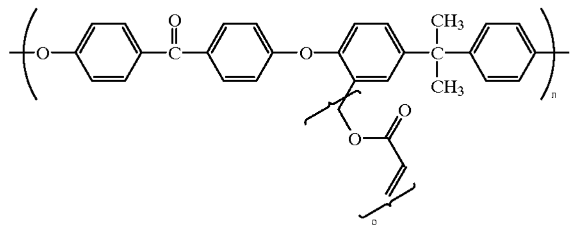

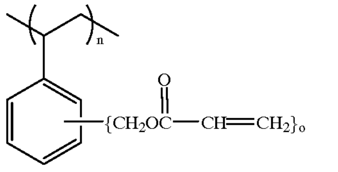

wherein o=0.2 to 2.0.

In this embodiment, the charge transport molecules, oxidants or oxidized salts are dispersed within the crosslinked polymer binder. The charge transport molecule is preferably added to the binder such that the amount of charge transport molecule in the crosslinked coating is from about 1 to about 80 percent, and preferably from about 20 to about 60 weight percent, based on the weight of total coating. The oxidant or the oxidized salt is preferably present in the overcoating in an amount of from about 0.1 to about 80 weight percent, preferably from about 0.1 to about 50 weight percent, and particularly preferred from about 1 to about 20 weight percent, based on the total weight of the polymer coating. The exact concentration of the oxidant depends on the relaxation time requirements of the particular donor roll. The preferred charge transport molecules are arylamine charge transport compounds, especially triarylamines and bistriarylamines with the following general structures:

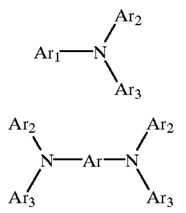

wherein Ar, $Ar_1$, $Ar_2$ and $Ar_3$ are aromatic groups.

A particularly preferred charge transport molecule includes a para-substituted molecule such as that having the formula:

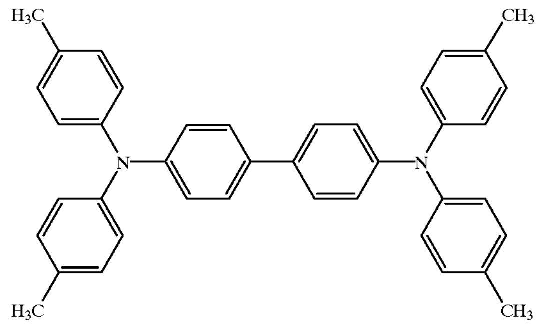

Oxidants and oxidized salts can be any known oxidants such as those described in U.S. Pat. Nos. 4,338,222, 5,587,224, 5,731,078 and 5,853,906, the disclosures each of which are incorporated by reference herein in their entirety. Oxidants include 2,4,6-trinitrobenzene, benzene sulfonic acid, dichloromaleic anhydride, tetrabromophthalic anhydride, 2,7-dinitro-9-fluorenone, 2,4,7-trinitro-9-fluorenone, tetraphenyl phthalic anhydride, $SeO_2$, $N_2O_4$, ferric chloride, both hydrated and anhydrous, trifluoroacetic acid (TFA), di-p-t-butyliodonium $AsF_6$, triphenylsulfonium $SbF_6$ and other similar oxidizing agents that accept one electron from the hole transport molecules. Photolysis of the crosslinked overcoating by UV light may be needed when photooxidants such as di-p-t-butyliodonium $AsF_6$, triphenylsulfonium $SbF_6$ are used. Oxidized salts comprised of an anion selected from the group consisting of $SbCl_6^-$, $SbCl_4^-$ and $PF_6^-$ and a cation selected from the group consisting of a triphenyl methyl+, tetraethylammonium+, benzyl dimethylphenyl ammonium+, 2,4,6-trimethyl pyrillium+, Ag+, K+, Na+, NO+, tris(4-bromophenyl)ammonium+, the cation radical of N,N,N',N'-[tetra(p-tolyl)-1,1'-biphenyl]-4,4'-diamine, and the like. More than one antioxidant or oxidized salt may be employed. When incorporated into the polymer binder, the incorporation may be achieved by any well known reaction technique, including those described in the aforementioned references incorporated herein by reference.

One procedure for the preparation of the donor roll coating of this embodiment comprises adding the crosslinkable polymer binder, and charge transport molecules if necessary, in a suitable solvent and stirring with a magnetic stirrer until a complete solution is achieved. The radical initiator and the oxidant or oxidized salt are added and the stirring continued to assure uniform distribution. The solvents can be one or a mixture of alkylene halides like methylene chloride, chlorobenzene, toluene, tetrahydroflran or mixtures thereof. The solution is then used to coat a donor roll substrate by spray, dip or ring coating. The coating is then dried at 100–125° C. for 30 min to 1 hour to give a coated donor roll with thickness in the range of 5 to 35 microns. The crosslinking process takes place during thermal drying.

As the polymer for the crosslinkable polyamides with hydroxy charge transport molecules and optional oxidants dispersed therein, it is selected from the group consisting of materials represented by the following Formulae I and II:

I

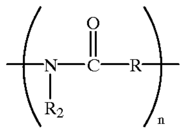

wherein:

n is a positive integer sufficient to achieve a weight average molecular weight between about 5,000 and about 100,000, R is an alkylene group containing from 1 to 10 carbon atoms, between 1 and 99 percent of the $R_2$ sites are H or

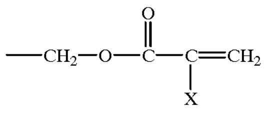

wherein X is selected from the group consisting of —H (acrylate), —$CH_3$(methacrylate), alkyl and aryl, and the remainder of the $R_2$ sites are selected from the group consisting of —H, —$CH_2OCH_3$, and —$CH_2OH$, and

II

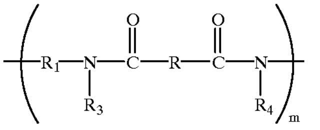

wherein:

m is a positive integer sufficient to achieve a weight average molecular weight between about 5000 and about 100000, R and $R_1$ are independently selected from the group consisting of alkylene units containing from 1 to 10 carbon atoms;

between 1 and 99 percent of $R_3$ and $R_4$ are independently selected from the group consisting of H or

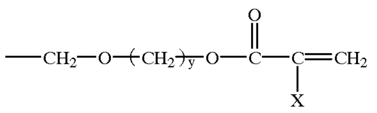

wherein

X is selected from the group consisting of hydrogen, alkyl, aryl and alkylaryl, wherein the alkyl groups contain 1 to 10 carbon atoms and the aryl groups contain 1 to 3 alkyl groups.

y is an integer between 1 and 10, and the remainder of the $R_3$ and $R_4$ groups are selected from the group consisting of —H, —$CH_2OH$, —$CH_2OCH_3$, and —$CH_2OC(O)$—$C(X)$=$CH_2$.

For R in Formula I, optimum results are achieved when the number of alkylene units containing less than 6 carbon atoms are about 40 percent of the total number of alkylene units. For R and $R_1$ in Formula II, optimum results are achieved when the number of alkylene units containing less than 6 carbon atoms are about 40 percent of the total number of alkylene units. Preferably, the alkylene unit R in polyamide Formula I is selected from the group consisting of $(CH_2)_4$ and $(CH_2)_6$, the alkylene units $R_1$ and $R_2$ in polyamide Formula II arc independently selected from the group consisting of $(CH_2)_4$ and $(CH_2)_6$, and the concentration of $(CH_2)_4$ and $(CH_2)_6$ is between about 40 percent and about 60 percent of the total number of alkylene units in the polyamide of the polyamide of Formula I or the polyamide of Formula II. Between about 1 mole percent and about 50 mole percent of the total number of repeat units of the polyamide polymer should contain methoxy methyl groups attached to the nitrogen atoms of amide groups. These polyamides should form solid films if dried prior to crosslinking. The polyamide should also be soluble, prior to crosslinking, in the alcohol solvents employed.

A preferred polyamide is represented by the following formula:

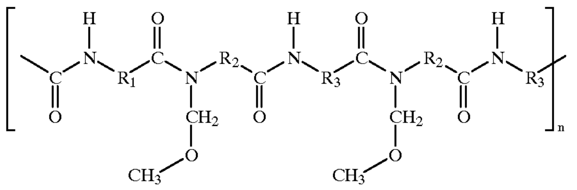

wherein $R_1$, $R_2$ and $R_3$ are alkylene units independently selected from units containing from 1 to 10 carbon atoms, and n is a positive integer sufficient to achieve a weight average molecular weight between about 5,000 and about 100,000.

For R, $R_1$ and $R_3$ in Formula II, optimum results are achieved when the number of alkylene units containing less than 6 carbon atoms are about 40 percent of the total number of alkylene units.

Typical alcohols in which the polyamide is soluble include, for example, butanol, ethanol, methanol, and the like. Typical alcohol soluble polyamide polymers having methoxy methyl groups attached to the nitrogen atoms of amide groups in the polymer backbone prior to crosslinking include, for example, hole insulating alcohol soluble polyamide film forming polymers such as Luckamide 5003 from Dai Nippon Ink, Nylon 8 with methylmethoxy pendant groups, CM4000 from Toray Industries, Ltd. and CM8000 from Toray Industries, Ltd. and other N-methoxymethylated polyamides, such as those prepared according to the method described in Sorenson and Campbell "Preparative Methods of Polymer Chemistry" second edition, pg. 76, John Wiley & Sons Inc. 1968, and the like and mixtures thereof. These polyamides can be alcohol soluble, for example, with polar functional groups, such as methoxy, ethoxy and hydroxy groups, pendant from the polymer backbone. It should be noted that polyamides, such as Elvamides from DuPont de Nemours & Co., do not contain methoxy methyl groups attached to the nitrogen atoms of amide groups in the polymer backbone.

The overcoating layer of this invention preferably comprises between about 50 percent by weight and about 98 percent by weight of the crosslinked film forming crosslinkable alcohol soluble polyamide polymer having methoxy methyl groups attached to the nitrogen atoms of the amide groups in the polymer backbone, based on the total weight of the overcoating layer after crosslinking and drying.

These film forming polyamides are also soluble in a solvent to facilitate application by conventional coating techniques. Typical solvents include, for example, butanol, propanol, methanol, butyl acetate, ethanol, cyclohexanone, tetrahydrofuran, methyl ethyl ketone, and the like and mixtures thereof. Crosslinking is accomplished by heating in the presence of a catalyst. Any suitable catalyst may be employed. Typical catalysts include, for example, oxalic acid, maleic acid, carboxylic acid, ascorbic acid, malonic acid, succinic acid, tartaric acid, citric acid, p-toluenesulfonic acid, methanesulfonic acid, and the like and mixtures thereof. The temperature used for crosslinking varies with the specific catalyst and heating time utilized and the degree of crosslinking desired. The degree of crosslinking can be controlled by the relative amount of catalyst employed. The amount of catalyst to achieve a desired degree of crosslinking will vary depending upon the specific polyamide, catalyst, temperature and time used for the reaction. A typical crosslinking temperature used for Luckamide with oxalic acid as a catalyst is about 125° C. for 30 minutes. A typical concentration of oxalic acid is between 5 and 10 weight percent based on the weight of Luckamide. After crosslinking, the overcoating should be substantially insoluble in the solvent in which it is soluble prior to crosslinking. Thus, no overcoating material will be removed when rubbed with a cloth soaked in the solvent. Crosslinking results in the development of a three dimensional network which restrains the hydroxy functionalized transport molecule as a fish is caught in a gill net.

The hydroxy charge transport molecules in this embodiment can be an hydroxy aromatic diamine represented by the following formula:

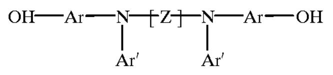

wherein:

Z is selected from the group consisting of:

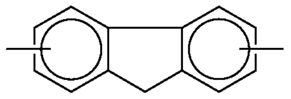
,
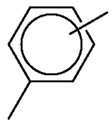
and
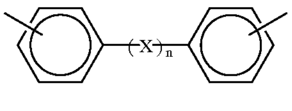

n is 0 or 1,

Ar is selected from the group consisting of:

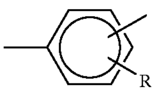
,
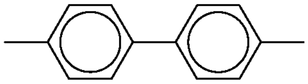
and

-continued

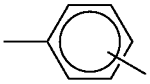

R is selected from the group consisting of $—CH_3$, $—C_2H_5$, $—C_3H_7$, and $—C_4H_9$, Ar' is selected from the group consisting of:

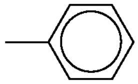
,
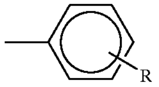
,
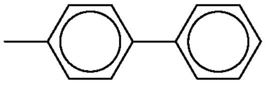
and
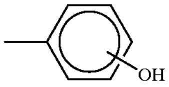

X is selected from the group consisting of:

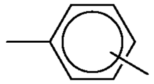
,
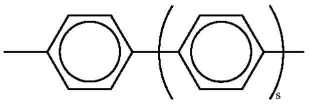

s is 0, 1 or 2.

Typical examples of hydroxy aromatic diamines include, for example, N,N'-diphenyl-N,N'-bis(3-hydroxyphenyl)-[1,1'-biphenyl]-4,4'-diamine; N,N,N',N',-tetra(3-hydroxyphenyl)-[1,1'-biphenyl]-4,4'-diamine; N,N'-diphenyl-N,N'-bis(3-hydroxyphenyl)-[1,1':4',1"-terphenyl]-4,4"-diamine, N,N'-diphenyl-N,N'-bis(4-hydroxyphenyl)-[1,1'-biphenyl]-4,4"-diamine, and the like. A specific preferred hydroxy functionalized aromatic diamine compound is N,N'-diphenyl-N,N'-bis(3-hydroxyphenyl)-[1,1'-biphenyl]-4,4'-diamine represented by the formula:

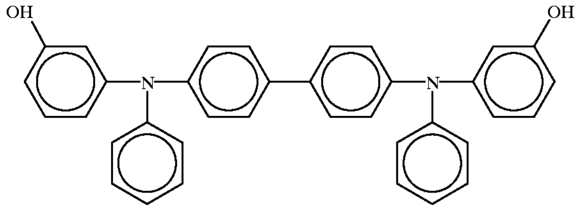

Examples of these hydroxy aromatic diamines are described, for example, in U.S. Pat. No. 4,871,634, the entire disclosure thereof being incorporated herein by reference.

The hydroxy charge transport molecules can also be selected from hydroxy triarylamine compounds represented by the formula:

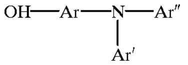

wherein:

Ar is selected from the group consisting of:

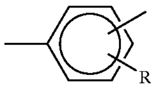 and 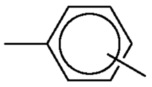

R is selected from the group consisting of —$CH_3$, —$C_2H_5$, —$C_3H_7$ and —$C_4H_9$, Ar' and Ar" are independently selected from the group consisting of:

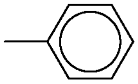, 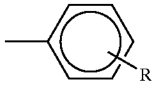, 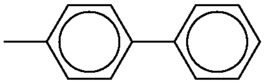, 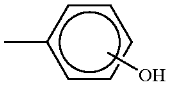 and 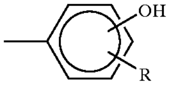

R is selected from the group consisting of —$CH_3$, —$C_2H_5$, —$C_3H_7$ and —$C_4H_9$, the hydroxy functionalized triarylamine compound being free of any direct conjugation between the —OH groups and the nearest nitrogen atom through one or more aromatic rings.

Typical hydroxy functionalized triarylamine compounds of this invention include, for example:

N-(3-hydroxyphenyl)-N-(4-methylphenyl)-N-phenyl amine;

N-(3-hydroxyphenyl)-N-bis(4-methylphenyl)amine N,N-di (3-hydroxyphenyl)-m-toluidine;

1,1-bis-[4-(di-N,N-m-hydroxpyphenyl)-aminophenyl]-cyclohexane;

1,1-bis[4-(N-m-hydroxyphenyl)-4-(N-phenyl)-aminophenyl]-cyclohexane;

N,N-di(4-hydroxyphenyl)-m-toluidine;

1,1-bis-[4-di-N,N-p-hydroxypyphenyl)-aminophenyl]-cyclohexane;

bis-N,N-[4'-hydroxy-4-(1,1'-biphenyl)]-aniline;

bis-N,N-[(2'-hydroxy-4-(1,1'-biphenyl)]-aniline, and the like.

Two specific preferred hydroxy functionalized triarylamine compounds are N-(3-hydroxyphenyl)-N-(4-methylphenyl)-N-phenyl amine (PTAP) and N-(3-hydroxyphenyl)-N-bis(4-methylphenyl)amine (DTAP) which are represented, respectively, by the formulae:

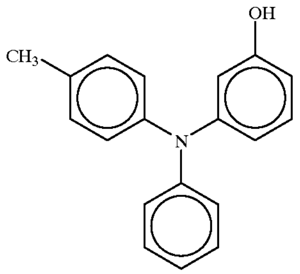 and

-continued

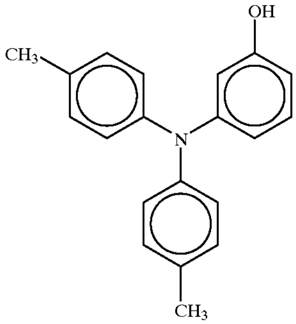

and mixtures thereof.

The concentration of the hydroxy charge transport molecules in the overcoat can, for example, be between about 20 percent and about 75 percent by weight, based on the total weight of the dried overcoat. Preferably, the concentration of the hydroxy charge transport molecules in the overcoat layer is between about 30 percent by weight and about 60 percent by weight, based on the total weight of the dried overcoat. The oxidant is preferably present in the coating in an amount of from about 0.1 to about 80 weight percent, preferably from about 0.1 to about 50 weight percent, and particularly preferred from about 1 to about 20 weight percent, based on the total weight of the polymer coating. The exact concentration of the oxidant depends on the relaxation time requirements of the particular donor roll. Oxidants can be any known oxidants such as those described in U.S. Pat. Nos. 4,338,222, 5,587,224 and 5,731,078, the disclosures each of which are incorporated herein in their entirety. Oxidants include 2,4,6-trinitrobenzene, benzene sulfonic acid, dichloromaleic anhydride, tetrabromophthalic anhydride, 2,7-dinitro-9-fluorenone, 2,4,7-trinitro-9-fluorenone, tetraphenyl phthalic anhydride, $SeO_2$, $N_2O_4$, ferric chloride, both hydrated and anhydrous, trifluoroacetic acid (TFA), di-p-t-butyliodonium $AsF_6$, triphenylsulfonium $SbF_6$ and other similar oxidizing agents that accept one electron from the hole transport molecules. Photolysis of the crosslinked overcoating by UV light may be needed when photooxidants such as di-p-t-butyliodonium $AsF_6$, triphenylsulfonium $SbF_6$ are used.

A thickness of between about 10 micrometer and about 25 micrometers in thickness is preferred. Any suitable and conventional technique may be utilized to mix and thereafter apply the overcoat layer coating mixture to the donor roll substrate. Typical application techniques include spraying, dip coating, roll coating, wire wound rod coating, and the like. Drying of the deposited coating may be effected by any suitable conventional technique such as oven drying, infrared radiation drying, air drying and the like.

The crosslinked semi-conductive oxidized transport (relaxation) layer described herein possesses excellent conductivity and good linear I/V behavior between −500 and +500 V with minimum residue voltage, and exhibit consistent performance with variable temperature and humidity (i.e., exhibit stability in composition and performance after exposure to 50° C. and 85–100% relative humidity of ≧24 hours. The oxidized transport coatings of the present invention have conductivities of from about $10^{-4}$ to about $10^{-12}$/ohm-cm, and preferably from about $10^{-7}$ to about $10^{-10}$/ohm-cm, which conductivity is controlled by the concentrations of the oxidant and the charge transport units contained in the coatings. The coatings are low cost and environmentally acceptable, and form uniform coatings that are pinhole and defect free.

The foregoing coatings typically exhibit good wear resistance up to, for example, 10 million copies. However, additional wear resistance up to 50 million copies or more may be desired. To achieve this, it is also an aspect of the present invention to add wear additives to the coating composition in order to increase the wear resistance of the coating without adversely affecting the performance of the coating. In particular, the wear additives have the effect of improving abrasion resistance and coefficient of friction of the coating so that the donor roll can make a greater number of cycles of contact to a rotating magnetic brush so as to prolong the life expectancy of the donor roll.

Typically, the particulate wear additives may be selected from among polytetrafluoroethylene (PTFE), and radiation modified PTFE, molybdenum disulfide, graphite powder, very fine glass, aromatic polyamide (Aramid), carbon fibers, microfine silicone resin (e.g., General Electric SR340 series, and General Electric and Toshiba Silicone Co. Tospearl fine particle silicone resins. The wear additives preferably have an average size of from 0.01 to 10 microns in diameter, most preferably from 0.1 to 5 microns in diameter.

The wear additives should be added in an amount such that the end coating contains from 0.1 to 15 percent by weight, preferably 1 to 10 percent by weight, of the wear additives, based on the overall weight of the coating.

The wear additives are preferably incorporated into the coating composition prior to application onto the surface of the donor roll. Suitable dispersion forming methods for incorporating the wear additives into the coating composition include, for example, ball milling, grinding and shear mixing. Well known dispersion aids, for example Fluorad or Titanate surfactants, may be added along with the wear additives in order to improve the dispersion within the composition. Once mixing is complete, the coating is then applied to the donor roll as discussed above, followed by chemical curing of the crosslinkable polymer binder and drying of the solvent.

Prior to operation of the donor roll, the surface of the coating containing the wear additives therein may be buffed in order to further expose the wear additives. This avoids the requirement of a break-in period with the donor roll in operation.

In a still firther embodiment of the present invention, a protective top coating may be provided over the crosslinked, semi-conductive relaxation layer. Such a top layer can also increase the wear resistance of the donor roll, and the top coating may be used alone or in conjunction with the use of wear additives such as discussed above. The outer protective layer may comprise inorganic materials with coating thicknesses in the range of from about 10 nm to about 10 micron, preferably from about 0.5 to about 5 micron. The inorganic coatings may comprise polysilicates derived from a sol-gel process and diamond-like nanocomposites derived from plasma deposition.

The protective layer may or may not be conductive. To render the protective layer conductive, appropriate amounts of a conductive filler, for example carbon black and the like, may be included in the polymer binder of the protective coating. The coating also may or may not contain additional additives in the range of from about 0.1 to about 50 percent by weight of the protective coatings. The additives include, but are not limited to, charge transport molecules and oxidants, and particulate fillers such as silica, TEFLON® powder, carbon fibers and mixtures thereof.

In another further embodiment of the present invention, the crosslinked coating can be deposited over known oxidized transport layers to give a donor roll with a two-layer structure. The thickness of the outer crosslinked layer is in the range of from about 10 nm to about 10 micron, preferably from about 0.5 to about 5 micron. The known oxidized transport layers have been disclosed in U.S. Pat. Nos. 4,338,222, 5,587,224, 5,731,078 and 5,853,906, incorporated herein by reference.

In embodiments, the crosslinked overcoating compositions can additionally include optional additives such as an alkaline anti-corrosion additive, and a voltage stabilizing additive. Examples of alkaline anti-corrosion additives include, for example, heterocyclic compounds with at least one nitrogen heteroatom, metallocene compounds, and mixtures thereof, for example, 2-(4-biphenylyl)-5,6-phenyl oxazole, 1,4-dichlorophthalazine, 1-phenyl pyrazole, di-pyridyl anthracenes, 1-phenyl-imidazole, 3-methyl-1-phenyl-pyrazole, 2,4,6-triphenyl-1,3,5-triazine, 2,6-di-t-butylpyridine, 4,7-diphenyl-1,10-phenanthroline, 2,6-bis(chloromethyl)pyridine, 2,5-diphenyl oxazole, 2,4,6-triphenoxy-1,3,5-triazine, 8-hydroxyquinoline aluminum, ferrocene, mixtures thereof, and the like. Many of the aforementioned heterocyclic compounds are known electron transport materials. Examples of ionic additives are metal acid salts such as silver trifluoroacetate, lithium difluorochloroacetate, and the like as disclosed in U.S. Pat. No. 5,731,078, incorporated herein by reference. These ionic salts can minimize the cumulation of residual voltage in the coatings.

The following examples further illustrate the present invention.

EXAMPLE 1

Preparation of Crosslinkable Poly(carbonate

First, a polymer with the structure

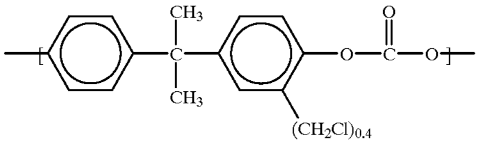

is made as follows. A 5-liter, 3-neck, round-bottom flask is situated in a silicone oil bath and is equipped with a mechanical stirrer, reflux condenser, argon inlet, and stopper. Acetyl chloride (184.75 grams) is then added dropwise to a mixture of dimethoxymethane (225 milliliters, 193 grams) and methanol (6.25 milliliters). To this solution is added 1,1,2,2-tetrachloroethane (500 milliliters) and then tin tetrachloride (0.8 milliliter) in 1,1,2,2-tetrachloroethane (100 milliliters). A solution of polyearbonate (Bayer Makrolon®, 50 grams) in 1,1,2,2-tetrachloroethane (625 milliliters) is then added. The resultant solution is then heated at reflux at 110° C. (oil bath set temperature) for 24 hours. After 4 hours at reflux, an aliquot of the reaction is added to methanol. A $^1$H NMR spectrum of the vacuum dried precipitate is consistent with a bisphenol A-based polycarbonate with 0.14 chloromethyl groups per repeat unit. After 24 hours at 110° C., a polycarbonate with 0.4 chloromethyl groups per repeat unit is obtained. The reaction solution is then added to methanol to precipitate the polymer product that is filtered, washed with methanol, and then vacuum dried with a yield of 51.12 grams.

Next, a polymer with the structure

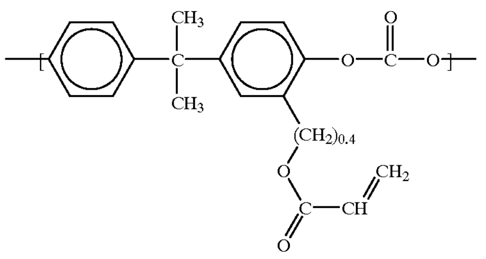

is prepared as follows. The polycarbonate resin with 0.4 chloromethyl groups per repeat unit (25 grams, in N,N-dimethylacetamide (300 milliliters) is magnetically stirred with sodium acrylate (14.3 grams) for 48 days. The reaction mixture is centrifuged and the liquid portion is then added to methanol (6 liters) to precipitate the polymeric product that is isolated by filtration and then vacuum dried. The polymer in methylene chloride (200 grams) is reprecipitated into methanol (4 liters), filtered and vacuum dried to obtain 22 grams of product.

EXAMPLE 2

Preparation of Crosslinkable Polystyrene

A polymer with the structure

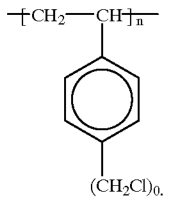

is made as follows. Acetyl chloride (64 milliliters, 71.41 grams) is added dropwise to dimethoxymethane (92 milliliters, 79.16 grams) and methanol (2.6 milliliters) in a 1-liter, 3-neck round-bottom flask equipped with a mechanical stirrer, reflux condenser, argon inlet, and stopper. To this is added methylene chloride (262 milliliters) and tin tetrachloride (0.4 milliliters) in methylene chloride (35 milliliters). Polystyrene (25 grams) in methylene chloride (275 grams) is then added and the reaction is heated in a silicone oil bath at 50° C. for 8 hours. After 4, 6 and 8 hours of reaction at 50° C., there are 0.08, 0.13, and 0.20 chloromethyl groups per repeat unit, respectively. The reaction solution is added to methanol and the polymer that precipitated is filtered, washed with methanol, and vacuum dried. The chloromethylated polystyrene is used to prepare a polymer with the structure

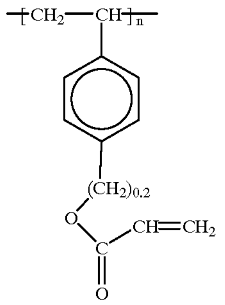

as follows. Polystyrene with 0.2 chloromethyl groups per repeat unit (13.4 grams) in N,N-dimethylacetamide (300 milliliters) is stirred with sodium acetate (9 grams) for 31 days. The reaction mixture is centrifuged, and the liquid portion is then added to water (8 liters) to precipitate the polymeric product that is isolated by filtration, washed with methanol, and then vacuum dried. The polymer in methylene chloride (100 grams) is reprecipitated into methanol (2 liters), filtered and vacuum dried to obtain 12 grams of product.

EXAMPLE 3

Preparation of Crosslinkable Polystyrene

A polymer with the structure

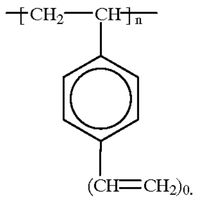

is made as follows. The chloromethylated polystyrene with 0.2-chloromethyl groups per repeat unit (10 grams, 19.2 millimoles, Example 2) in tetrahydroflran (160 milliliters) is added to triphenylphosphine (12 grams, 46 millimoles) and boiled at reflux for 15 hours. The insoluble polymer is extracted with benzene (800 milliliters). Methylene chloride is added and the solution is added to hexanes to precipitate the polymer that is washed with toluene and then hexanes and then is vacuum dried to yield 13.62 grams of polymer with the structure shown below.

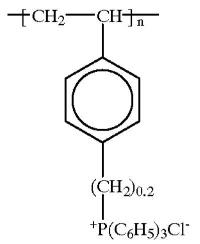

The polymeric phosphonium salt (12.62 grams, 16.16 millimoles) in methanol (230 milliliters) is stirred with Triton B (2.3 grams, 40 wt. % aqueous N-benzyltrimethylammonium hydroxide), formaldehyde (37 wt. % aqueous solution), and 50 wt. % aqueous sodium hydroxide (41.55 milliliters). The reaction mixture is neutralized with acetic acid and washed with water and then methanol. After vacuum drying, 7 grams of product are obtained which is dissolved in methylene chloride, precipitated into methanol, washed with water and then methanol. After vacuum drying, 6 grams of product are obtained.

EXAMPLE 4

Preparation of Crosslinkable Poly(arylene ether ketone) (1)

A polymer, namely poly(4-CPK-BPA), with the structure

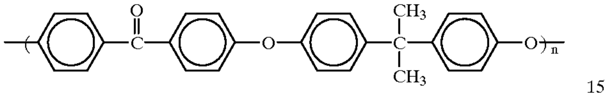

is made as follows. A 5-liter, 3-neck round-bottom flask equipped with a Dean-Stark trap (Barrett trap), condenser, mechanical stirrer, argon inlet, and stopper is situated in a silicone oil bath. 4,4'-dichlorobenzophenone (Aldrich Chemical Co., Milwaukee, Wis., 403.95 grams), bisphenol A (Aldrich Chemical Co., 340.87 grams), potassium carbonate (491.7 grams), anhydrous N,N-dimethylacetamide (2250 milliliters), and toluene (412.5 milliliters, 359.25 grams) are added to the flask and heated to 170° C. (oil bath temperature) while the volatile toluene component is collected and removed. After 48 hours of heating at 170° C. with continuous stirring, the reaction mixture is allowed to cool to 25° C. The reaction mixture is filtered to remove insoluble salts, and the solution is then added to methanol to precipitate the polymer. The polymer is isolated by filtration, washed with water and then methanol, and then is vacuum dried. After vacuum drying, the yield of poly(4-CPK-BPA) is 460 grams.

Chloromethylation of poly(4-CPK-BPA) to give a polymer with the following structure is performed as follows.

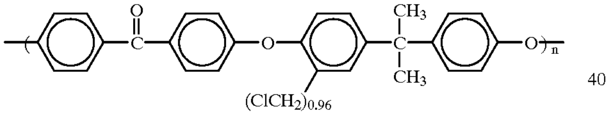

is made as follows. To a 5-liter 3-neck round-bottom flask equipped with a mechanical stirrer, reflux condenser, argon inlet and stopper that is situated in an ice bath are added sequentially, acetyl chloride (184 grams), dimethoxymethane (225 milliliters, 193 grams), methanol (6.25 milliliters), methylene chloride (500 milliliters), and poly(4-CPK-BPA) (75 grams, see above) in methylene chloride (625 milliliters). To this is added tin tetrachloride (6.5 milliliters) via an air-tight syringe. The reaction mixture is heated for 4 hours at 55° C. oil bath set temperature. After cooling to 25° C., the reaction mixture is added to methanol to reprecipitate the polymer with 0.96 chloromethyl groups per repeat unit.

A crosslinkable poly(arylene ether ketone) (1) with the structure (1)

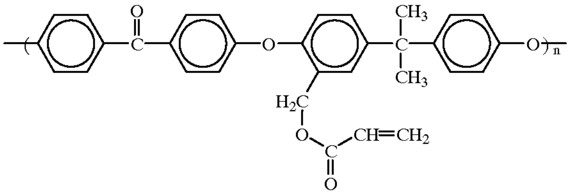

is made as follows. The chloromethylated poly(4-CPK-BPA) (15 grams) in N,N-dimethylacetamide (300 milliliters) is magnetically stirred with sodium acrylate (Aldrich Chemical Co., 9 grams) for one month. The reaction mixture is centrifuged, and the reaction solution is decanted off from residual salts. The solution is added to water to precipitate a white polymer that is filtered, washed with water, then methanol, and then is vacuum dried.

EXAMPLE 5

Preparation of Crosslinkable Poly(arlene ether ketone) (2)

A polymer with the structure

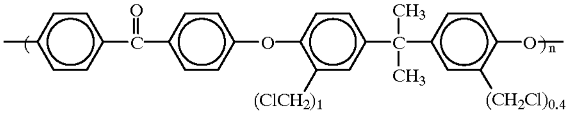

is made as follows. To a 1-liter 3-neck round-bottom flask equipped with a mechanical stirrer, reflux condenser, argon inlet and stopper that is situated in a silicone oil bath are added sequentially, acetyl chloride (140.1 grams, 128 milliliters), dimethoxymethane (157.6 grams), methanol (5 milliliters), tetrachloroethane (500 milliliters), and poly(4-CPK-BPA) (40 grams) in tetrachloroethane (500 milliliters). To this is added tin tetrachloride (0.6 milliliter) via an air-tight syringe. The reaction mixture is heated for 2 hours at 110° C. oil bath set temperature. After cooling to 25° C., the reaction mixture is added to methanol to reprecipitate the polymer with 1.44 chloromethyl groups per repeat unit.

A crosslinkable Poly(arylene ether ketone) (2) with the structure (2)

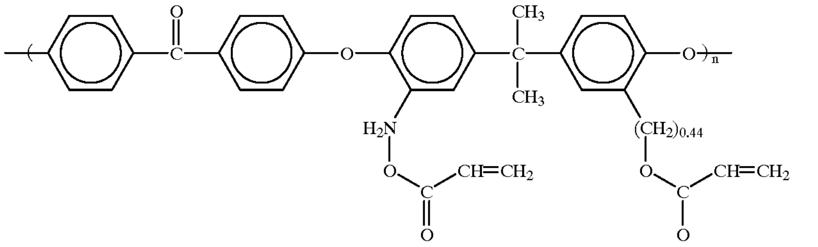

is made as follows. The chloromethylated polymer (1.44 $CH_2Cl$ groups per repeat unit, 15 grams) in N,N-dimethylacetamide (283 grams) is magnetically stirred with sodium acrylate (Aldrich Chemical Co., 9 grams) for one month. The reaction mixture is centrifuged, and the reaction solution is decanted off from residual salts. The solution is added to water to precipitate a white polymer that is filtered, washed with water, then methanol, and then is vacuum dried. The polymer in methylene chloride is reprecipitated into methanol, is filtered, and then vacuum dried.

EXAMPLE 6

Preparation of Crosslinkable Poly(arylene ether ketone)

A polymer with the structure

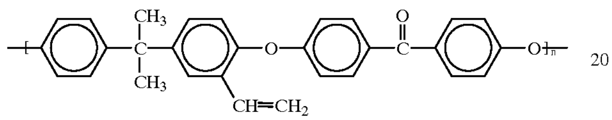

is made as follows. A solution of polyarylene ether ketone with 0.96 chloromethyl group per repeat unit (7.34 grams, 0.0192 mole) in dioxane (80 grams) is added to triphenylphosphine (12 grams, 0.0458 mole). After 6 hours of reflux at 120° C. (silicone oil bath set temperature) with mechanical stirring and cooling to 25° C., the polymer solidified, and the solvent is decanted off. The solid residue is extracted with diethyl ether (250 milliliters) over 15 minutes. To a solution of the triphenylphosphonium chloride salt of chloromethylated polyarylene ether ketone in methylene chloride (250 milliliters) is added Triton B (5 grams of a 40-wt. % aqueous solution) and formaldehyde (16 milliliters of a 37 wt. % aqueous solution). The stirred reaction mixture is treated slowly with 50-wt. % aqueous sodium hydroxide (50 milliliters). After 7 hours stirring at 25° C., the organic layer is separated, washed with dilute hydrochloric acid, then with water, and then is dried over magnesium sulfate. The methylene chloride layer is added to methanol to precipitate the polymer, which is filtered and vacuum dried. The $^1H$ NMR spectrum of the product is consistent with one vinyl group per repeat unit.

EXAMPLE 7

Preparation of Crosslinked Charge Relaxation Layer

This example illustrates a typical procedure for the fabrication of the conductive coatings of the present invention. MYLAR® (75 microns) substrates with titanium coatings of about 200 to 300 Angstroms are from ICI. Substrates are overcoated with a silane blocking layer (200 to 500 Angstroms derived from 2-aminoisopropyltriehoxylsilane) and then an adhesive layer (200 to 500 Angstroms) of 49K polyester (from DuPont). The resulting substrates are used for depositing the conductive coatings using a Gardner mechanical driven film applicator which is enclosed in a plexiglass acrylic box with an attached cover. A substrate is placed on the vacuum plate of the Gardner coater and a size 0.004 Bird film applicator is placed on top of the substrate then coated with a conductive polymer layer using a solution prepared as follows: Into three glass amber bottles is each added crosslinkable polymer (1, Example 4) (2 gram), methylene chloride (22.44 grams in each instance), N,N'-diphenyl-N,N'-bis(3"-methylphenyl)-(1,1'-biphenyl)-4,4'-diamine) (1.35 grams in each instance, referred to as m-TPD hereinafter, prepared as disclosed in U.S. Pat. No. 4,265,990, the disclosure of which is totally incorporated herein by reference), and the hexafluoroantimonate cation radical salt of N,N,N',N'-tetra-p-tolyl-(1,1'-biphenyl)-4,4'-diamine) (27 mg, referred to as TM-TPD.$SbF_6$hereinafter, prepared as disclosed in U.S. Pat. No. 5,853,906, the disclosure of which is totally incorporated herein by reference). The mixture is roll milled complete solubilization of the solid materials. Into two of the coating solutions is added 2,2'-azobisisobutyronitrile (AIBN) (10 mg or 50 mg). Three other coating solution based on crosslinkable polymer (2, Example 5) are similarly prepared.

The resulting coating is air dried for 1 h and then dried in a forced air oven at 125° C. for 30 min to give a coating with about 20 microns thick. An Electrodag electrode is painted on the sample for charge relaxation time measurement which involved applying a pulsed voltage to the sample between electrodes. All coatings give a similar charge relaxation time of about 0.5 millisecond.

EXAMPLE 8

Preparation of Two-Layered Charge Relaxation Layer with Crosslinked Top Coating A MYLAR® (75 microns) substrate with titanium coatings of about 200 to 300 Angstroms are from ICI. Substrates are overcoated with a silane blocking layer (200 to 500 Angstroms derived from 2-aminoisopropyltriehoxylsilane) and then an adhesive layer (200 to 500 Angstroms) of 49K polyester (from DuPont). The resulting substrates are used for depositing the semiconductive coatings using a Gardner mechanical driven film applicator which is enclosed in a plexiglass acrylic box with an attached cover. A substrate is placed on the vacuum plate of the Gardner coater and a size 0.004 Bird film applicator is placed on top of the substrate then coated with a semiconductive polymer layer using a solution prepared as follows: a mixture of m-TPD (4.0 g), MAKROLON® (7.44 g), TM-TPD.$SbF_6$ (0.08 g), and methylene chloride (68 g) in an amber bottle is roll milled until complete solubilization of the solid occurred to give a coating solution with the following solid weight percents: MAKROLON® (65%), m-TPD (35%) and TM-TPD.$SbF_6$ (2% with respect to m-TPD. The resulting coating is air dried for 1 h and then dried in a forced air oven at 125° C. for 30 min to give a coating with about 20 microns thick. Prior to application of the crosslinkable top coat layer, a primer layer is applied using a #3 Meyer rod from a solution of 0.1 weight percent Elvacite 2008 in 90:10 weight ratio of isopropyl alcohol and water. This prime coating is air dried in the hood. The overcoat layer is prepared by mixing 10 grams of a 10 percent by weight solution of polyamide containing methoxymethyl groups (Luckamide 5003, available from Dai Nippon Ink) in a 90:10 weight ratio solvent of methanol and n-propanol and 10 grams of N,N'-diphenyl-N,N'-bis(3-hydroxyphenyl)-[1,1-biphenyl]-4,4"-diamine, a hydroxy charge transport molecule, in a roll mill for 2 hours. Immediately prior to application of the overcoat layer mixture, 0.1 gram of oxalic acid is added and the resulting mixture is roll milled briefly to assure dissolution. This coating solution is applied to the primed photoreceptor using a #20 Mayer rod. This overcoat layer is air dried in a hood for 30 minutes. The air dried film is then dried in a forced air oven at 125° C. for 30 minutes. The overcoat layer thickness is approximately 3 micrometers. The oxalid acid caused crosslinking of the methoxymethyl groups of the polyamide to yield a tough, abrasion resistant, hydrocarbon liquid resistant top surface. An Electrodag electrode is painted on the sample for charge relaxation time measurement which involved applying a pulsed voltage to the sample between electrodes. A charge relaxation time of about 0.8 millisecond is observed.

What we claim is:

1. A donor member comprising a substrate and having thereover a crosslinked oxidized transport coating comprising a charge transport molecule, a crosslinked polymer formed from a crosslinkable polymer binder, and an oxidant, wherein the crosslinkable polymer binder is a polymer having a general structure

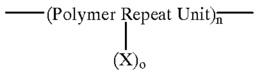

wherein the polymer repeating unit is a polyether, polycarbonate, polyethercarbonate, polyester, polyimide, polyimine, polyurethane, polysiloxane, polyethersulfone or polystyrene, $(X)_o$ is a crosslinker selected from the group consisting of $(CH_2)_mCH{=}CH_2$, $(CH_2)_mOCH_2CH_2OCH{=}CH_2$, $(CH_2)_m$—OH(Na, K, Li), —$(CH_2)_m$—$NH_2$,

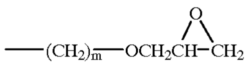

—$(CH_2)_mOCN$, —$CH_2OC(O)CH{=}CH_2$, $CH_2(CH_2)_m CH_2COCl$ and norborene, wherein m is an integer of from 1 to 12 and o ranges from 0.2 to 2.0, and n is a positive integer sufficient to achieve a weight average molecular weight between about 5,000 and about 200,000, and wherein both the charge transport molecule and the oxidant are dispersed in the crosslinkable polymer binder.

2. A donor member in accordance with claim 1, wherein the crosslinkable polymer binder is:

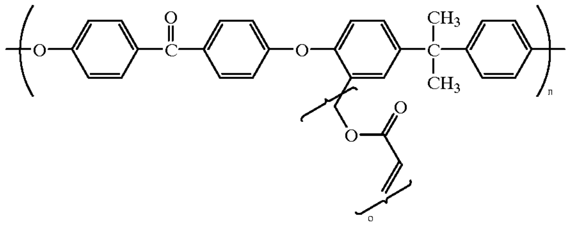

or

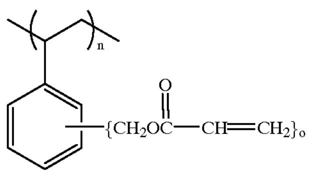

3. A donor member in accordance with claim 1, wherein the charge transport molecule is present in an amount of from about 1 to about 80 percent by weight of the crosslinked coating, based on the weight of dried coating, and the charge transport molecule is an arylamine charge transport compound having the following general structures:

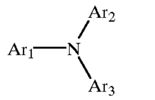

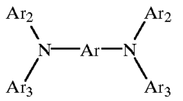

wherein Ar, $Ar_1$, $Ar_2$ and $Ar_3$ are aromatic groups.

4. A donor member in accordance with claim 1, wherein the oxidant is present in the coating in an amount of from about 0.1 to about 80 weight percent, based on the total weight of the dried coating.

5. A donor member in accordance with claim 4, wherein the oxidant is selected from the group consisting of 2,4,6-trinitrobenzene, benzene sulfonic acid, dichloromaleic anhydride, tetrabromophthalic anhydride, 2,7-dinitro-9-fluorenone, 2,4,7-trinitro-9-fluorenone, tetraphenyl phthalic anhydride, $SeO_2$, $N_2O_4$, ferric chloride, both hydrated and anhydrous, trifluoroacetic acid (TFA), di-p-t-butyliodonium $AsF_6$, and triphenylsulfonium $SbF_6$.

6. A donor member in accordance with claim 1, wherein the crosslinked oxidized transport coating has a thickness of between about 10 micrometer and about 25 micrometers.

7. A donor member in accordance with claim 1, wherein the crosslinked oxidized transport coating further comprises a particulate wear additive having an average diameter of from 0.1 to 10 microns in an amount of from 0.1 to 15 weight percent based on a weight of the dried coating.

8. A donor member in accordance with claim 7, wherein the wear additive is polytetrafluoroethylene, molybdenum disulfide, graphite powder, glass, aromatic polyamide, carbon fiber or microfine silicone resin.

9. A donor member in accordance with claim 1, wherein the donor member further comprises an inorganic protective coating over the crosslinked oxidized transport coating.

10. A printing machine wherein an electrostatic latent image recorded on a photoconductive member is developed to form a visible image thereof, comprising a housing defining a chamber storing a supply of developer material;

a donor member spaced from the photoconductive member and being adapted to transport toner to a region opposed from the photoconductive member, the donor member comprising a substrate and having thereover a crosslinked oxidized transport coating comprising a charge transport molecule, a crosslinked polymer formed from a crosslinkable polymer binder, and an oxidant, wherein the crosslinkable polymer binder is a polymer having a general structure

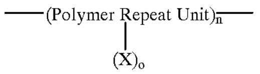

wherein the polymer repeating unit is a polyether, polycarbonate, polyethercarbonate, polyester, polyimide, polyimine, polyurethane, polysiloxane, polyethersulfone or polystyrene, $(X)_o$ is a crosslinker selected from the group consisting of $(CH_2)_mCH{=}CH_2$, $(CH_2)_m OCH_2CH_2 OCH{=}CH_2$, $(CH_2)_m$—OH(Na, K, Li), —$(CH_2)_m$—$NH_2$,

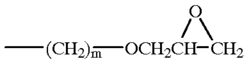

—$(CH_2)_mOCN$, —$CH_2OC(O)CH{=}CH_2$, $CH_2(CH_2)_mCH_2COCl$ and norborene, wherein m is an integer of from 1 to 12 and o ranges from 0.2 to 2.0, and n is a positive integer sufficient to achieve a weight average molecular weight between about 5,000 and about 200,000, and wherein both the charge transport molecule and the oxidant are dispersed in the crosslinkable polymer binder; and electrode members in the donor member, the electrodes being electrically biased to detach toner from the donor member so as to form a toner cloud in the space between the electrode member and the photoconductive member, with detached toner from the toner cloud developing the electrostatic latent image formed on the photoconductive member.

* * * * *